United States Patent
Danet

(10) Patent No.: US 9,522,736 B2
(45) Date of Patent: Dec. 20, 2016

(54) FIXATION DEVICE COMPRISING A TOGGLE JOINT, FOR AN AIRCRAFT SEAT

(71) Applicant: ATTAX, Carrieres sur Seine (FR)

(72) Inventor: Romain Danet, Maisons-Laffitte (FR)

(73) Assignee: ATTAX, Carrieres sur Seine (FR)

( * ) Notice: Subject to any disclaimer, the term of this patent is extended or adjusted under 35 U.S.C. 154(b) by 0 days.

(21) Appl. No.: 14/802,937

(22) Filed: Jul. 17, 2015

(65) Prior Publication Data
US 2016/0016668 A1    Jan. 21, 2016

(30) Foreign Application Priority Data
Jul. 18, 2014    (FR) ..................................... 14 56945

(51) Int. Cl.
*B64D 11/06*    (2006.01)
*F16B 2/18*    (2006.01)

(52) U.S. Cl.
CPC ............. *B64D 11/0696* (2013.01); *F16B 2/18* (2013.01); *F16B 2/185* (2013.01)

(58) Field of Classification Search
USPC ... 248/503, 503.1, 500; 244/118.6; 410/101, 410/104, 105
See application file for complete search history.

(56) References Cited

U.S. PATENT DOCUMENTS

| | | | | |
|---|---|---|---|---|
| 4,047,689 A | * | 9/1977 | Grendahl | B60P 7/0815 410/105 |
| 4,277,043 A | * | 7/1981 | Weik | B64D 11/0696 248/503.1 |
| 4,376,522 A | * | 3/1983 | Banks | B64D 11/0696 244/118.6 |
| 2007/0065248 A1 | * | 3/2007 | Legeay | B60N 2/01575 410/105 |
| 2010/0090060 A1 | * | 4/2010 | Marechal | B64D 11/0696 244/118.6 |
| 2011/0253874 A1 | * | 10/2011 | Marechal | B64D 11/0696 248/503.1 |

(Continued)

FOREIGN PATENT DOCUMENTS

| | | |
|---|---|---|
| DE | 198 51 392 A1 | 5/1999 |
| FR | 2 857 400 A1 | 1/2005 |

(Continued)

OTHER PUBLICATIONS

International Search Report for FR 14569545 dated Mar. 10, 2015, in 2 pages.

*Primary Examiner* — Steven Marsh
(74) *Attorney, Agent, or Firm* — Knobbe Martens Olson and Bear, LLP

(57) ABSTRACT

A fixation device for an aircraft seat includes a base including an attachment for attaching the base on the rail of the aircraft. The attachment is movable according to a retracted assembly/disassembly position and active attachment position of the seat. The fixation device also includes a maneuvering lever for moving the attachment. The maneuvering lever is movable according to a retracted assembly/disassembly position and active position-blocking position of the attachment. The maneuvering lever includes a device for locking in the active blocking position. The maneuvering lever is associated with a toggle joint for crossing a hard point comprising articulation yoke for connecting rods articulated on the base. At least one of the connecting rods is associated with the attachment.

14 Claims, 2 Drawing Sheets

(56) References Cited

U.S. PATENT DOCUMENTS

2011/0278398 A1\* 11/2011 Marechal ........... B60N 2/01516
　　　　　　　　　　　　　　　　　　　　　244/131
2016/0039526 A1\* 2/2016 Mejuhas ............ B60N 2/01575
　　　　　　　　　　　　　　　　　　　　　248/188.9

FOREIGN PATENT DOCUMENTS

| FR | 2 947 772 A1 | 1/2011 |
| FR | 2 947 773 A1 | 1/2011 |

\* cited by examiner

FIXATION DEVICE COMPRISING A TOGGLE JOINT, FOR AN AIRCRAFT SEAT

BACKGROUND

Field of the Invention

The present invention relates to a fixation device for a seat, for example an aircraft seat, in a rail of the rest of that aircraft.

Description of Related Art

Seat fixation devices in this technical field are disclosed in the related art, for example, Patent Application Publication FR 2,947,772 and 2,947,773 in the applicant's name.

BRIEF SUMMARY

A fixation device includes a base associated with the rest of the seat and including an attachment device for attaching the base on the rail of the aircraft.

These attachment device can be moved between a retracted assembly/disassembly position of the seat and an active attachment position of the seat, for example, by an operator, by manipulating a maneuvering lever movable between retracted assembly/disassembly and active position-blocking positions of the attachment device.

Furthermore, this lever includes a locking device for locking the seat in the active blocking position.

These devices can be developed to meet a certain number of requirements relative to safety and ease of assembly and disassembly of the seat.

Machining allowances of the parts may make it necessary to provide, in a fixation system, devices for absorbing size variations of the parts.

In particular, buffers made from elastically deformable material are used for example.

However, even after such devices for absorbing size variations are applied, when fastening is not perfect, it may results in vibrations. The vibrations will be sources of noise that may prove bothersome.

Embodiments of the invention aim to resolve these problems.

To that end, embodiments of the invention relates to a fixation device for a seat, for example an aircraft seat, in a rail of the rest of that aircraft, including a base associated with the rest of the seat and including means (devices) for attaching the latter by gripping it on the rail of the aircraft, movable between retracted assembly/disassembly and active attachment positions of the seat, by an operator using a maneuvering lever movable between retracted assembly/disassembly and active position-blocking positions of the attachment device and which includes a device for locking in the active blocking position, wherein the maneuvering lever is associated with a toggle joint device for crossing the hard point comprising articulation yoke for connecting rods also articulated on the base, at least one of which is associated with the attachment device for the seat in order to move the latter between their retracted position for assembly/disassembly of the seat and the active attachment position thereof;

- the attachment device for the seat comprise a indexing, centering and force reacting device for the base on the rail;
- the attachment device for the seat comprise a device for gripping the base on the rail;
- the connecting rods include a front connecting rod, a first end of which is articulated on the base, a second end of which is articulated on the articulation yoke and an intermediate portion of which between its ends includes a movement surface for the centering and force reacting device between a retracted position for adjusting the position of the base and an active centering and force reacting position;
- the connecting rods include a rear connecting rod, a first end of which is articulated on the yoke, an intermediate portion of which is articulated on the base, and a second end of which is associated with jaws for gripping the base on the rail;
- the second end of the rear connecting rod is generally fork-shaped with two branches positioned on either side of the base, each of which is provided with a gripping jaw at its end;
- the jaws are mounted on the ends of a guide rod extending between the ends of the branches of the fork and crossing through the base in a guide aperture for the movements of that rod, the ends of the guide rod extending in apertures of the jaws to allow the jaws to move between the retracted and active positions, perpendicular to the rail;
- the lever has a determined (predetermined) angular travel (trajectory) relative to the articulation yoke, in a release direction of the device for crossing the hard point to facilitate the unlocking of the attachment device;
- the front end of the lever includes a disconnectable locking device in the active blocking position thereof;
- the locking device include a latch-forming device supported by one of the members, lever or base, and suitable for cooperating in the active position with retaining a of the other member, base or lever, to lock the lever in the active position;
- the latch-forming device is movable to allow the latch-forming device to cross the retaining device and become engaged in the locking position therewith, and to extricate themselves from said retaining device under the action of rotating maneuvering device during their disconnection actuated by the operator;
- the lever includes a display device for indicating its locked or unlocked state;
- the display device for indicating the locked or unlocked state of the lever are provided on its upper face.

BRIEF DESCRIPTION OF THE DRAWINGS

Embodiments of the invention will be better understood using the following description, provided solely as an example and done in reference to the appended drawings, in which.

DETAILED DESCRIPTION

These figures show a fixation device for a seat, for example an aircraft seat, in a rail of the rest of that aircraft.

The fixation system is designated by general reference 1 in these figures and includes a base associated with the rest of the seat.

This base is designated by general reference 2 and for example includes, in its rear part, a lug 3 for fastening part of the seat.

Of course, different connecting methods for connecting the seat to the base can be considered. The seat can thus be integral with the base, connected thereto by an intermediate part, etc.

In its lower part, this base includes protruding heels such as the heel 4, which are part of the composition of the attachment device by gripping the latter on the rail of the aircraft.

Figure 1:
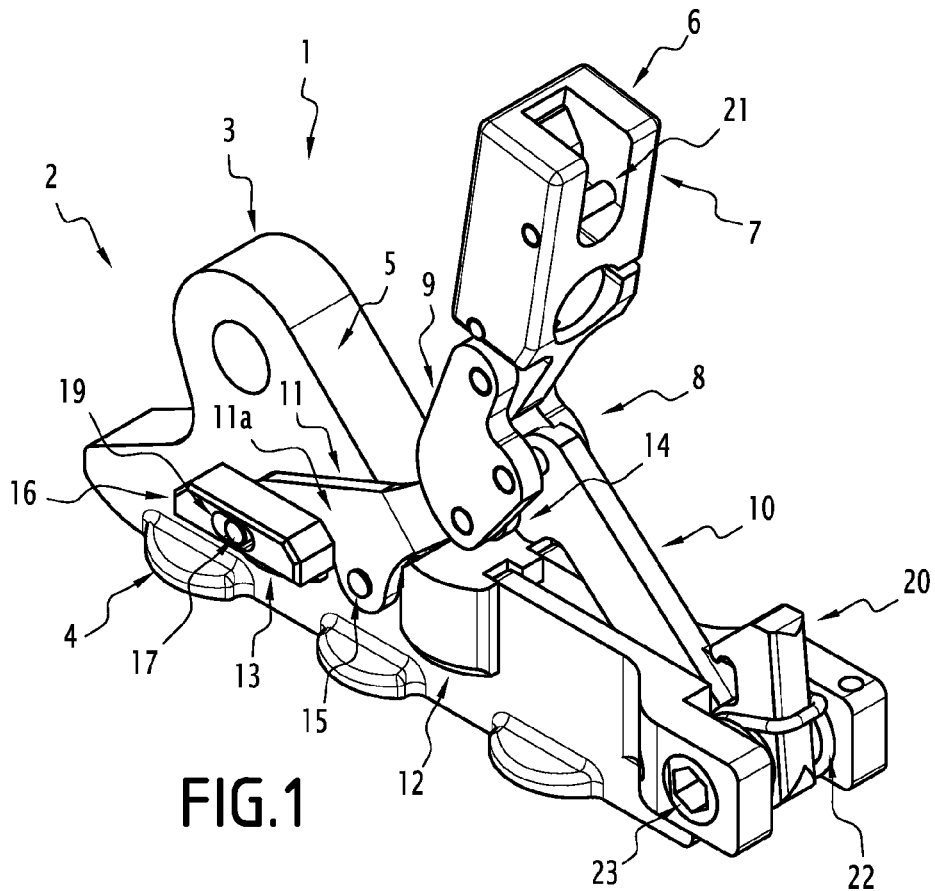
FIGS. 1 and 2 show perspective views illustrating a fixation device according to certain embodiments of the invention in the assembly/disassembly position of the seat and the attachment position of the seat, respectively.
Figure 2:
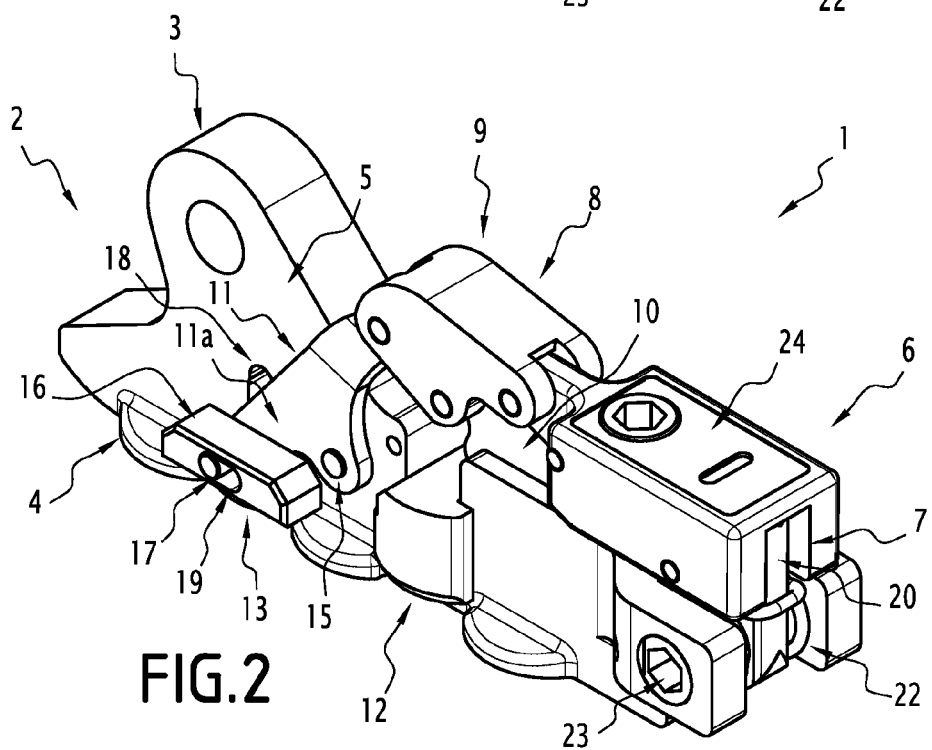
Figure 3:
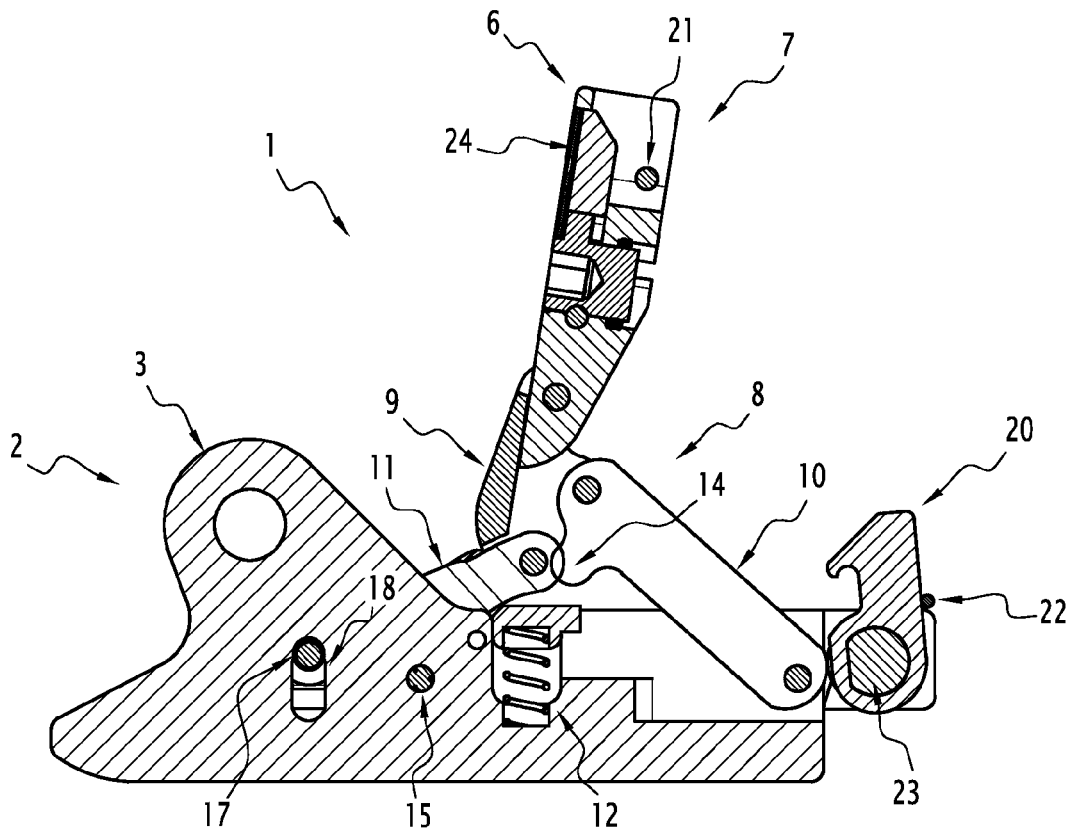
FIGS. 3 and 4 show corresponding sectional side views of the device.
Figure 4:
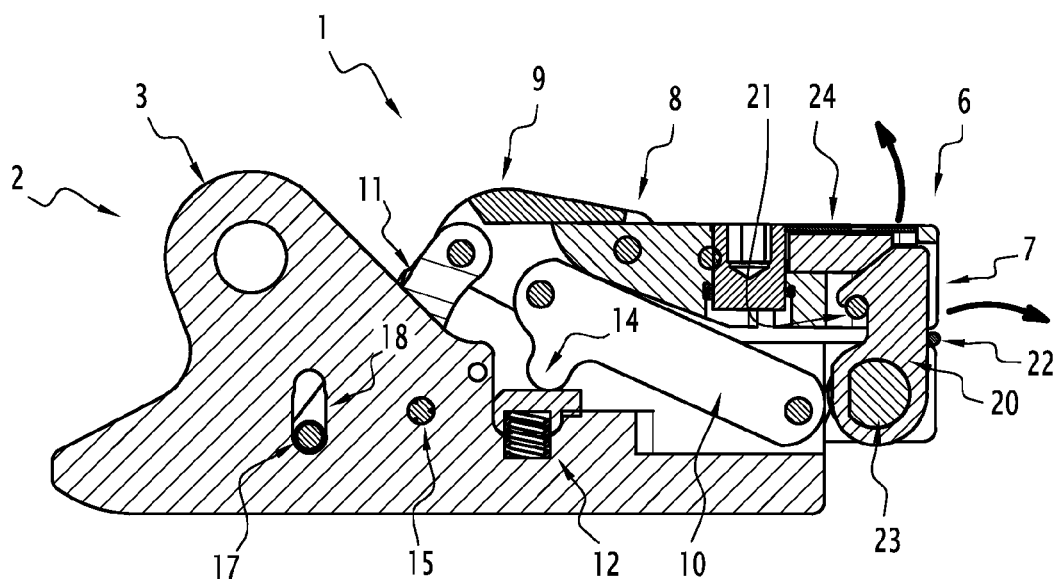

Indeed, the base includes a gripping attachment device designated by general reference 5, which are movable, as illustrated, between a retracted assembly/disassembly position for the seat as illustrated in FIGS. 1 and 3, and an active attachment position of the seat as illustrated in FIGS. 2 and 4, by an operator for example using a maneuvering lever designated by general reference 6.

Indeed, this maneuvering lever is movable between a retracted assembly/disassembly position illustrated in FIGS. 1 and 3, and an active position illustrated in FIGS. 2 and 4, for blocking the attachment device in position.

As will be described in more detail later, this lever also includes a locking device in the active blocking position, designated by general reference 7.

According to embodiments of the invention, the maneuvering lever 6 is associated with a device for crossing the hard point 8 for moving the attachment device 5 between a retracted assembly/disassembly position of the seat and the active attachment position of the seat.

As illustrated in these figures, the maneuvering lever 6 is associated with a toggle joint device for crossing the hard point, comprising an articulation yoke 9 for connecting rods 10 and 11 also articulated on the base and at least one of which is associated with the attachment device for the seat to move them between their retracted and active positions.

In fact, the use of such devices for crossing the hard point has several advantages.

One of the advantages of this use is the stressing of the system and the absorption of the machining allowance of the parts to avoid generating vibrations or noises, for example.

To that end, in the system according to embodiments of the invention, buffers made from elastic material, such as an elastomer or other material, are not used.

It is the toggle joint mechanism for crossing hard points, implementing connecting rods, that ensures that the stressing.

Another advantage of the use of such a system is that the device for crossing a hard point makes it possible to positively define the active blocking position of the lever and the attachment device, independently of the safety provided by the device for locking the lever in the blocking position.

In the example embodiment shown in these figures, the attachments for the seat comprise two types of elements, i.e., centering and force reacting elements of the base on the rail, or even position indexing, and device for gripping the base on the rail.

These devices are designated by references 12 and 13 and are respectively associated with the connecting rods 10 and 11.

In light of these figures, it in fact appears that the connecting rods comprise a front connecting rod 10, a first end of which is articulated on the base, and a second end of which is articulated on the articulation yoke 9. An intermediate portion of this front connecting rod, between these ends, includes a movement surface 14 for the centering and force reacting or even indexing device 12, for example made up of a pin mounted to be elastically movable in the base, between an upper retracted position-adjusting position of the base and a lower active centering and force reacting, or even indexing, position in the rail.

In the illustrated example, the connecting rods also include the rear connecting rod 11, a first end of which is articulated on the yoke 9, an intermediate portion of which is for example articulated at 15 on the base, and a second end of which is associated with jaws for gripping the base on the rail.

One of these jaws is designated by general reference 16 in FIGS. 1 and 2.

In fact and as is illustrated, the second end of the rear connecting rod 11 is for example generally fork-shaped with two branches, one of which is for example designated by general reference 11A in these FIGS. 1 and 2.

These branches extend on either side of the base, and each is provided at its end with a gripping jaw like the jaw 16.

Indeed, these jaws 16 are mounted on the ends of a guide rod designated by general reference 17 in these figures, extending between the ends of the branches of the fork and passing through the base in an aperture, for example 18, for guiding the movements of that rod.

The ends of the guide rod 17 extend in apertures of the jaws such as the aperture 19 for the jaw 16, to allow the jaws to move between the retracted and active positions, perpendicular to the rail.

It should also be noted that the lever may have a determined angular travel relative to the articulation yoke 9, in a direction releasing the device for crossing hard points, to facilitate the unlocking of the attachment device by the operator.

As previously indicated, the front of the lever 6 can include disconnectable device 7 for locking in the active blocking position thereof.

These devices have a relatively traditional structure as already described in the aforementioned prior documents, i.e., they can include a latch-forming device for example designated by general reference 20 in these figures, supported by one of the members, lever or base, and suitable for cooperating in the active position with retaining device, for example 21, of the other member, base or lever, to lock the lever in the active position.

In the example described in these figures, the latch-forming device 20 is supported by the base 20 while the retaining device 21 is provided at the end of the lever and for example assume the form of a retaining rod.

Of course, an inverse arrangement and different embodiments of these devices can be considered.

It will simply be noted that the latch-forming device can be elastically movable to allow them to cross the retaining device and to engage in the locked position therewith, and to be released from the retaining device under the action of rotating maneuvering device when they are disconnected, actuated by the operator.

This is for example visible in these figures inasmuch as one can see that the latch-forming device is associated with an elastic device designated by general reference 22.

The rotating maneuvering device can for example be formed by a tool such as a maneuvering key suitable for being engaged in a recess of the end of an articulation rod 23 of the latch-forming device at the corresponding end of the base.

Furthermore and as is illustrated in these figures, and in particular in FIG. 2, the lever 6 can also include a visual indicator device for displaying locking or unlocking state.

The visual indicator device is for example designated by general reference 24 in these figures and is, for example, provided on the upper face of the lever.

Indeed, these indicator device may for example be formed by a control plate with two parts in different colors, for example green and red, and movable in front of an aperture of the lever to show the part in one or the other of those colors depending on the locked or unlocked state of the lever.

One can then see that the operation of this structure is as follows.

In the unlocked position, as illustrated in FIG. 1, the assembly operator can adjust the position of the seat, the fixation device moving on the rail, since it is neither pinched nor gripped.

Once in the desired position, the assembly operator lowers the lever from the position 2 illustrated in FIG. 1 to the position illustrated in FIG. 2.

During this movement, the lever drives a pivoting of the articulation yoke, and therefore a movement of the front and rear connecting rods.

The front connecting rod bears on the pin 12 to move it, while the rear connecting rod 11 tilts and causes pinching of the rail between the heels of the base and the gripping jaws.

This movement continues and causes crossing of the hard point after passing through the aligned position of the articulation points or fastening of the lever and connecting rods on the yoke.

The device is then in the gripping position, and the toggle joint mechanism for crossing hard points causes a reaction of the play related to the size variations of the parts.

Furthermore, the lever 6, and more particularly in the described example, the retaining device 21, have become engaged below the latch-forming device 20, said latch-forming device having withdrawn under elastic bias to allow them to pass, so as to obtain the safe fixation and locking in position previously described.

Many other embodiments may of course also be considered.

What is claimed is:

1. A fixation device for an aircraft seat comprising:
a base associated with the aircraft seat, the base including an attachment configured to attach the base on a rail of an aircraft, the attachment being movable according to a retracted assembly/disassembly position and active attachment position of the seat; and
a maneuvering lever for moving the attachment, the maneuvering lever movable according to a retracted assembly/disassembly position and active position-blocking position of the attachment, the maneuvering lever including a lock for locking in the active blocking position,
wherein the maneuvering lever is associated with a toggle joint for crossing a hard point comprising articulation yoke for connecting rods articulated on the base, at least one of the connecting rods being associated with the attachment.

2. The fixation device according to claim 1, wherein the attachment comprises a centering and force reacting device for the base on the rail.

3. The fixation device according to claim 1, wherein the attachment comprises a grip configured to grip the base on the rail.

4. The fixation device according to claim 2, wherein the connecting rods include a front connecting rod, a first end of which is articulated on the base, a second end of which is articulated on the articulation yoke and an intermediate portion of which between its ends includes a movement surface for the centering and force reacting device between a retracted position for adjusting the position of the base and an active centering and force reacting position.

5. The fixation device according to claim 1, wherein the connecting rods include a rear connecting rod, a first end of which is articulated on the yoke, an intermediate portion of which is articulated on the base, and a second end of which is associated with jaws for gripping the base on the rail.

6. The fixation device according to claim 5, wherein the second end of the rear connecting rod is generally fork-shaped with two branches positioned on either side of the base, each of which is provided with a gripping jaw at its end.

7. The fixation device according to claim 6, wherein the jaws are mounted on the ends of a guide rod extending between ends of branches of the fork-shaped second end of the rear connecting rod and crossing through the base in a guide aperture for the movements of that rod, the ends of the guide rod extending in apertures of the jaws to allow the jaws to move between the retracted and active positions, perpendicular to the rail.

8. The fixation device according to claim 1, wherein the maneuvering lever has a predetermined angular travel relative to the articulation yoke, in a release direction of the toggle joint for crossing the hard point to facilitate the unlocking of the attachment.

9. The fixation device according to claim 1, wherein a front end of the maneuvering lever includes a disconnectable lock in the active blocking position thereof.

10. The fixation device according to claim 9, wherein the disconnectable lock include a latch supported by one of the lever and the base, and suitable for cooperating in the active position with a retainer of the other one of the lever and the base, to lock the lever in the active position.

11. The fixation device according to claim 10, wherein the latch is movable to allow the latch to cross the retainer and become engaged in the locking position therewith, and to extricate the latch from the retainer under the action of rotating maneuvering devices during their disconnection actuated by an operator.

12. The fixation device according to claim 1, wherein the lever includes a display for visually indicating its locking or unlocking state.

13. The fixation device according to claim 12, wherein the display is provided on an upper face of the lever.

14. A method for fixing an aircraft seat to an aircraft, comprising:
moving an attachment on a base of the aircraft seat from a retracted assembly/disassembly position to an active attachment position of the seat by moving a maneuvering lever;
locking the attachment in an active blocking position
attaching the attachment to a rail of the aircraft through a toggle joint crossing a hard point comprising an articulation yoke for connecting rods articulated on the base, at least one of the connecting rods being associated with the attachment.

* * * * *